(12) United States Patent
Zerfass et al.

(10) Patent No.: US 8,331,642 B2
(45) Date of Patent: Dec. 11, 2012

(54) METHOD AND DEVICE FOR DETERMINING A CONTOUR AND A CENTER OF AN OBJECT

(75) Inventors: Thorsten Zerfass, Nuremberg (DE); Tobias Bergen, Erlangen (DE); Dirk Steckhan, Munich (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 211 days.

(21) Appl. No.: 12/980,385

(22) Filed: Dec. 29, 2010

(65) Prior Publication Data

US 2011/0123090 A1 May 26, 2011

Related U.S. Application Data

(63) Continuation of application No. PCT/EP2009/004280, filed on Jun. 15, 2009.

(30) Foreign Application Priority Data

Jun. 30, 2008 (DE) .................. 10 2008 030 874

(51) Int. Cl.
*G06K 9/00* (2006.01)
(52) U.S. Cl. ........ 382/134; 382/128; 382/133; 382/173; 435/2; 435/34; 436/63
(58) Field of Classification Search .......... None
See application file for complete search history.

(56) References Cited

U.S. PATENT DOCUMENTS 5,934,278 A * 8/1999 Ishihara et al. ............... 600/476
6,473,698 B1 * 10/2002 Albert et al. .................. 702/45

(Continued)

FOREIGN PATENT DOCUMENTS

DE 10 2006 021 042 A1 10/2007

OTHER PUBLICATIONS

Nilsson et al.,"Segmentation of complex cell clusters in microscopic images: application to bone marrow samples," 2005, Cytometry, vol. 66, No. 1, pp. 24-31.*

(Continued)

*Primary Examiner* — Matthew Bella
*Assistant Examiner* — Jason Heidemann
(74) *Attorney, Agent, or Firm* — Keating & Bennett, LLP

(57) ABSTRACT

A method for determining a contour of an object in a digital image includes determining a preliminary object center and determining contour candidate image points. The contour candidate image points are determined as image points on a plurality of paths leading away from a preliminary object center by detecting a change from a first section to a second section on a feature space based on the image point value range of the digital image or by detecting the exceeding of a predetermined strength of a feature change in the feature space, wherein the contour candidate image points have a distance to the preliminary or to an improved object center and are ordered according to a polar angle. Further, the method includes determining zones of neighboring contour candidate image points within which a change of the distance of the contour candidate image points lies above a threshold value and an elimination of contour candidate image points which lie between the zones of neighboring contour candidate image points. Finally, a determination of the contour is executed on the basis of the remaining contour candidate image points.

22 Claims, 10 Drawing Sheets

U.S. PATENT DOCUMENTS

| | | | | |
|---|---|---|---|---|
| 8,064,680 | B2* | 11/2011 | Ramoser et al. | 382/134 |
| 2006/0204953 | A1* | 9/2006 | Ptitsyn | 435/4 |
| 2008/0212868 | A1* | 9/2008 | Ramoser et al. | 382/134 |

OTHER PUBLICATIONS

Harms, "Segmentation of stained blood cell images measured at high scanning density with high magnification and high numerical aperture opticsm", Nov. 1986, Cytometry, vol. 7, Issue 6, pp. 522-531.*

Poon et al. "Automated image detection and segmentation in blood smears", 1992; Cytometry 13:766-774.*

Sethian, "A fast marching level set method for monotonically advancing fronts," in Proc. of the National Academy of Sciences, 1996, vol. 93(4), pp. 1591-1595.*

Bamford et al., "Unsupervised cell nucleus segmentation with active contours", Signal Processing, vol. 71, No. 2, pp. 203-213, Elsevier Science Publishers, Amsterdam, The Netherlands, Dec. 15, 1998.

Hu et al., "Automated cell nucleus segmentation using improved snake", vol. 4, pp. 2737-2740, International Conference on Image Processing (ICIP), Singapore, Oct. 24, 2004.

Dijkstra, "A Note on Two Problems in Connexion with Graphs", Numerische Mathematik 1, pp. 269-271, Mathematisch Centrum, Amsterdam, The Netherlands, 1959.

Kapur et al., "A New Method for Gray-Level Picture Thresholding Using the Entropy of the Histogram", Computer Vision, Graphics and Image Processing 29, pp. 273-285, 1985.

Kittler et al., "On Threshold Selection Using Clustering Criteria", IEEE Transactions on Systems, Man and Cybernetics, vol. SMC-15, No. 5, pp. 652-655, Sep./Oct. 1985.

Kittler et al., "Minimum Error Thresholding", Pattern Recognition vol. 19, No. 1, pp. 41-47, Pattern Recognition Society, Pergamon Press, Great Britain, 1986.

Kuwahara et al., "Processing of RI-Angiocardiographic", Digital Processing of Biomedical Images, Plenum Press, pp. 187-202, New York, USA, 1976.

Lezoray et al., "Cooperation of Color Pixel Classification Schemes and Color Watershed: A Study for Microscopic Images", IEEE Transactions on Image Processing, vol. 11, No. 7, pp. 783-789, Jul. 2002.

Liao et al., "An Accurate Segmentation Method for White Blood Cell Images", IEEE Intern. Symposium on Biomedical Imaging, S. pp. 245-248, 2002.

Nilsson et al., "Segmentation of Dense Leukocyte Clusters", IEEE, S. pp. 221-227, 2001.

Ongun et al., "Automated contour detection in blood cell images by an efficient snake algorithm", Nonlinear Analysis 47, pp. 5839-5847, 2001.

Otsu, "A Threshold Selection Method from Gray-Level Histograms", IEEE Transactions on Systems, Man and Cybernetics, vol. SMC-9, No. 1, pp. 62-66, Jan. 1979.

Ramoser et al., "Leukocyte segmentation and classification in blood-smear images", IEEE, Engineering in Medicine and Biology 27th Annual Conference, Sep. 1-4, 2005, pp. 3371-3374, Shanghai, China.

Shinha et al., "Automation of Differential Blood count", TENCON 2003, Conf. on Convergent Technologies for Asia-Pacific Region, Bd. 2, S. pp. 547-551, 2003.

Official Communication issued in corresponding International Patent Application No. PCT/EP2009/004280, mailed on Sep. 24, 2009.

* cited by examiner

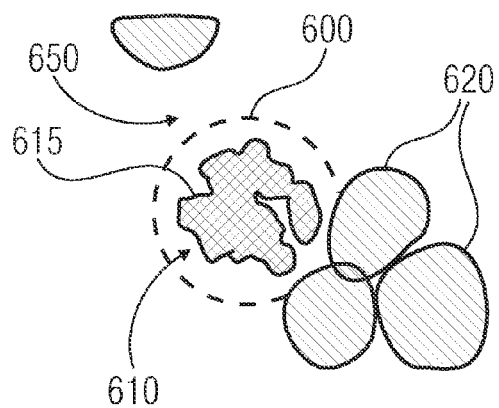
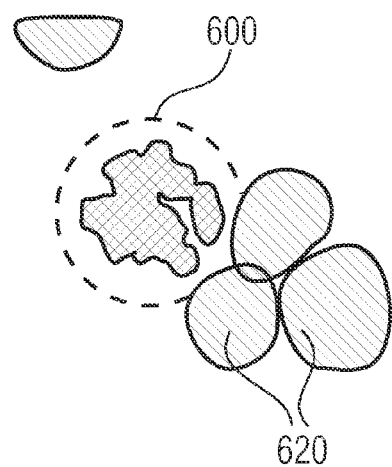
FIGURE 6A          FIGURE 6B
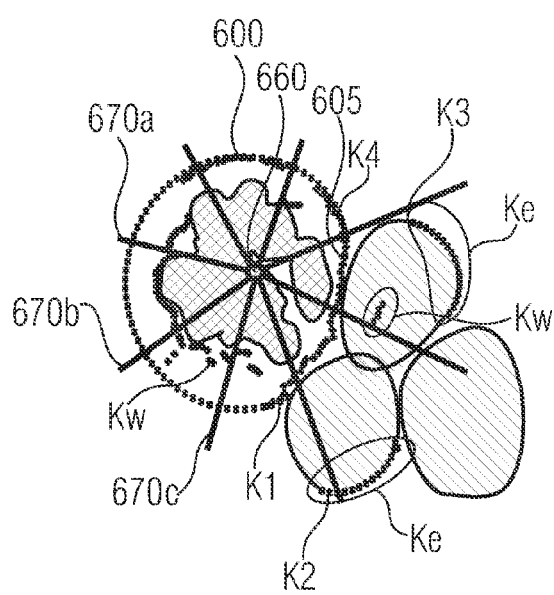
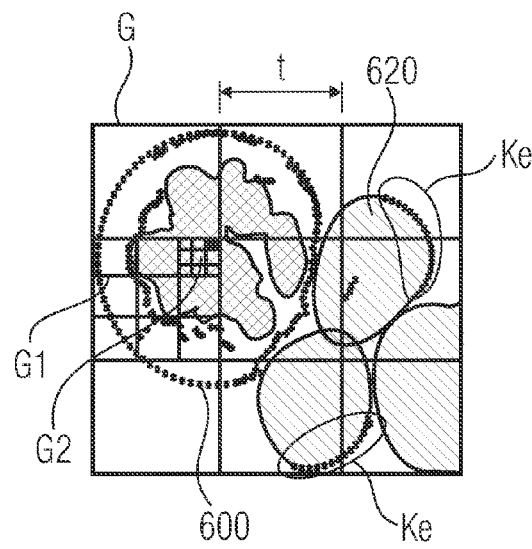
FIGURE 6C          FIGURE 6D

METHOD AND DEVICE FOR DETERMINING A CONTOUR AND A CENTER OF AN OBJECT

CROSS-REFERENCE TO RELATED APPLICATIONS

This application is a continuation of copending International Application No. PCT/EP2009/004280, filed Jun. 15, 2009, which is incorporated herein by reference in its entirety, and additionally claims priority from German Application No. DE 102008030874.9-53, filed Jun. 30, 2008, which is incorporated herein by reference in its entirety.

BACKGROUND OF THE INVENTION

Embodiments of the present invention relate to a method and a device for determining a contour and a center of an object. Further, embodiments relate to a segmenting of leukocytes in microscopic images of blood smears.

One important part of hematology is the differential blood count. Systems from the field of "computer-assisted microscopy" (CAM) enable an automatic analysis of blood smears and support the hematologist in the classification of the cells and thus form a supplement for modern hematological laboratory diagnostics.

Modern hematology systems provide important information on the cell population of peripheral blood in a fast, precise and highly efficient way. However, frequently in hospitals and laboratories up to 40% of the samples are post-differentiated manually under the microscope. In particular this last step may be accelerated and objectified by means of a system of computer-assisted microscopy. Here, both the working effort is reduced and also the quality of diagnosis is increased, which applies in particular also to abnormal blood samples.

Based on innovative concepts of image processing, leukocytes (white blood cells) are localized in blood smears and classified into clinically relevant sub-classes. Here, reference data sets pre-classified by experts, which may be expanded at any time, are frequently taken as the basis for classification.

The reliable detection and exact segmentation of white blood cells in colored blood smears of peripheral blood forms the basis for the automatic image-based generation of the differential blood count in the context of medical laboratory diagnostics. Frequently, in a first step a segmentation is executed with low resolution (e.g. 10× lens) for localizing the white blood cells. In a second step with a higher resolution (e.g. with a 100× lens), the exact segmentation of the cells is a precondition for the high accuracy of the following steps of classification. The accuracy of segmentation also relates, for example, to an exact segmentation of the nucleus and plasma of the cell, which is in particular desirable to be able to separately determine the features for the nucleus and the plasma. The accuracy of segmentation finally has a decisive effect on the quality of the classification of the cell.

The variety of white blood cells occurring in a blood smear in connection with their respective characteristic color distribution and texturing increase the difficulty of classification in complete automation. With conventional methods for the segmentation of white blood cells the exact separation of the nucleus and the plasma and the separation of neighboring erythrocytes (red blood cells) is not solved satisfactorily. Likewise, the known algorithms do not treat all types of leukocytes.

Examples of conventional methods for segmentation are described in the following documents: SINHA, N. and A. RAMAKRISHNAN: *Automation of differential blood count.* In: TENCON 2003. Conf. on convergent Technologies for Asia-Pacific Ragion, Vol. 2, p. 547-551, 2003; LIAO, Q. and Y. DENG: *An accurate segmentation method for white blood cell images.* In: IEEE Intern. Symposium on Biomedical Imaging, p. 245-248, 2002; RAMOSER H., V. LAURAIN, H. BISCHOF and R. ECKER: *Leukocyte segmentation and classification in blood-smear images.* In: 27th Annual Intern. Conf. of the Engineering in Medicine and Biology Society, S. 3,371-3,374, September 2005; LEZORAY, O and H. Cardot: *Cooperation of color pixel classification schemes and color watershed: a study for microscopic images.* IEEE Trans. on Image Processing, 11(7): 783-789, 2002; NILSSON, B. and A. HEYDEN: *Segmentation of Dense Leukocyte clusters.* P. 221-229, 2001; ONGUN, G., U. HALICI and K. LEBLEBICIOGLU: *Automated contour detection in blood cell images by an efficient snake algorithm.* Nonlinear Analysis, 47:5839-5847(9), 2001.

For the identification of regions in a characteristic color or color distribution, threshold value methods are frequently used. Conventional threshold value methods include, for example, the method of Otsu (OTSU, N.: *A threshold selection method from gray level histograms.* IEEE Trans. Systems, Man and Cybernetics, 9:62-66, 1979) the method of Kittler (KITTLER, J. and J. ILLINGWORTH: *On threshold selection using clustering criteria.* IEEE Trans. Systems, Man and Cybernetics, 15(5): 652-654, 1985; KITTLER, J. and J. ILLINGWORTH: *Minimum error thresholding.* 19(1): 41-47, 1986) or the method of Kapur (KAPUR, J., P. SAHOO and A. WONG: *A new method for gray level picture thresholding using the entropy of histogram.* Computer Vision, Graphics and Image Processing, 29(3): 273-285, 1985)

To finally obtain a continuous contour of the object or the cell, for example path-tracking algorithms may be used. The method of Dijkstra (DIJKSTRA, E. W.: *A note on two problems in connexion with graphs.* In: Numerische Mathematik, Vol. 1, p. 269-271. Mathematisch Centrum, Amsterdam, The Netherlands, 1959) represents a possible conventional path-tracking method.

Based on this conventional technology, it is the object to provide a method for segmentation (e.g. of leukocytes in differential blood counts) which—in contrast to conventional methods—solves the following issues:
(a) robust segmentation of different cell classes,
(b) robust segmentation with neighboring erythrocytes and
(c) robust segmentation with variations in coloring and illumination.

Apart from that it is desirable not only to detect and segment blood cells but generally to reliably detect contours of objects in digital images to be able to subsequently classify the same.

SUMMARY

According to an embodiment, a method for determining a contour of an object in a digital image may have the steps of determining a preliminary object center; determining contour candidate image points as image points on a plurality of paths leading away from the preliminary object center, by detecting a change from a first section to a second section of a feature space based on an image point value range of the digital image or by detecting the exceeding of a predetermined strength of a feature change in the feature space, wherein the detection is executed along the paths leading away and the contour candidate image points have distances to the preliminary object center and are ordered according to a polar angle; evaluating the distances to acquire a quality level for the preliminary object center; determining a further object center and further distances of the contour candidate image points to the further object center; evaluating the further distances to acquire a further quality level, wherein the quality level and the further quality level indicate probabilities that the respective preliminary or further object center is located at the center in the contour; selecting an improved object image point from the preliminary or the further object center using the quality level and the further quality level; determining zones of neighboring contour candidate image points within which a change of the distances or the further distances of the contour candidate image points is above a threshold value; eliminating contour candidate image points lying between the zones of neighboring contour candidate image points and having greater distances than the remaining contour candidate image points; and determining the contour on the basis of the remaining contour candidate image points, wherein the quality level and the further quality level indicate probabilities that the corresponding preliminary or further object center are at the center of the contour.

According to another embodiment, a method for determining a center of an organic cell with a cell nucleus and cell plasma to segment the same in a digital image, wherein the cell plasma is delimited by a contour of the object from a background and defined by a plurality of contour candidate image points may have the steps of (a) determining a preliminary object center; (b) determining distances of the plurality of contour candidate image points to the preliminary object center; (c) evaluating the distances to acquire a quality level for the preliminary object center; (d) determining a further object center and repeating steps (b) and (c) for the further object center to acquire a further quality level; and (e) selecting an object center from the preliminary or the further object center using the quality level and the further quality level.

According to another embodiment, a device for determining a contour of an object in a digital image, wherein in the digital image the object has a first hue value and a background has a second hue value, may have a determiner for determining a preliminary object center; a determiner for determining contour candidate image points as image points on a plurality of paths leading away from preliminary object centers by detecting a change from a first section to a second section of a feature space based on an image point value range of a digital image or by detecting the exceeding of a predetermined strength of a feature change in the feature space or by detecting the exceeding of a predetermined strength of a feature change in the feature space, wherein detecting is executed along the paths leading away and the contour candidate image points have distances to the preliminary or to an improved object center and are ordered according to a polar angle; an evaluator for evaluating the distances to acquire a quality level for the preliminary object center; a selector for selecting an improved object center using the quality level; a determiner for determining zones of neighboring contour candidate image points within which a change of the distances of the contour candidate image points lies above a threshold value; an eliminator for eliminating contour candidate image points between the zones of contour candidate image points, wherein the contour candidate image points to be eliminated have greater distances than the remaining contour candidate image points; and a determiner for determining the contour on the basis of the remaining contour candidate image points, wherein the quality level indicates a probability that the preliminary object center lies in the center of the contour.

According to another embodiment, a device for determining a center of an object in a digital image, wherein a contour of the object is defined by a plurality of contour candidate image points, may have a determiner for determining a preliminary and a further object center; a determiner for determining distances of the plurality of contour candidate image points to the preliminary and to the further object center; an evaluator for evaluating the distances to acquire a quality level for the preliminary object center and a further quality level for the further object center; and a selector for selecting an object center from the preliminary or the further object center using the quality level and the further quality level.

According to another embodiment, a computer program may have a program code for executing the method for determining a contour of an object in a digital image, which may have the steps of determining a preliminary object center; determining contour candidate image points as image points on a plurality of paths leading away from the preliminary object center, by detecting a change from a first section to a second section of a feature space based on an image point value range of the digital image or by detecting the exceeding of a predetermined strength of a feature change in the feature space, wherein the detection is executed along the paths leading away and the contour candidate image points have distances to the preliminary object center and are ordered according to a polar angle; evaluating the distances to acquire a quality level for the preliminary object center; determining a further object center and further distances of the contour candidate image points to the further object center; evaluating the further distances to acquire a further quality level, wherein the quality level and the further quality level indicate probabilities that the respective preliminary or further object center is located at the center in the contour; selecting an improved object image point from the preliminary or the further object center using the quality level and the further quality level; determining zones of neighboring contour candidate image points within which a change of the distances or the further distances of the contour candidate image points is above a threshold value; eliminating contour candidate image points lying between the zones of neighboring contour candidate image points and having greater distances than the remaining contour candidate image points; and determining the contour on the basis of the remaining contour candidate image points, wherein the quality level and the further quality level indicate probabilities that the corresponding preliminary or further object center are at the center of the contour, when the computer program is executed on a computer.

According to another embodiment, a computer program may have a program code for executing the method for determining a center of an organic cell with a cell nucleus and cell plasma to segment the same in a digital image, wherein the cell plasma is delimited by a contour of the object from a background and defined by a plurality of contour candidate image points, which may have the steps of (a) determining a preliminary object center; (b) determining distances of the plurality of contour candidate image points to the preliminary object center; (c) evaluating the distances to acquire a quality level for the preliminary object center; (d) determining a further object center and repeating steps (b) and (c) for the further object center to acquire a further quality level; and (e) selecting an object center from the preliminary or the further object center using the quality level and the further quality level, when the computer program is executed on a computer.

It is the central idea of the present invention that, in a method for determining a contour of an object in a digital image in which the object comprises a first hue value with respect to a color space and a background comprises a second hue value, first of all a preliminary object center of the object is determined. Subsequently, based on the preliminarily determined object center contour candidate image points are determined. This is executed by means of paths leading away from the object center and determining a change from the first hue value to the second hue value, wherein the position of change in the color space corresponds to the contour candidate image point. Alternatively, also a change or a leap of a color gradient in a used color space may be used for identifying the contour candidate image points. Each contour candidate image point thus comprises a distance to the preliminary or to an improved object center and is ordered with respect to a polar angle. Further, zones of neighboring contour candidate image points are determined in which a change of the distances of the contour candidate image points is above a threshold value. Between two zones finally the contour candidate image points are eliminated, so that the contour is determined on the basis of the remaining contour candidate image points.

A further central idea of the present invention is that an object center in a digital image, wherein a contour of the object is defined by a plurality of contour candidate image points, may be determined by the following sequence of steps. First of all, as before, a preliminary object center is determined. Thereupon, a determination of distances between the plurality of contour candidate image points and the preliminary object center is executed. An evaluation of the distances follows in order to obtain a quality level, wherein the quality level indicates a probability that the preliminary object center lies in the center of the contour. The described procedure is repeated for a further object center so that a further quality level is obtained. Finally, an object center is selected from the preliminary or the further object center using the quality level and the further quality level.

The quality level may, for example, be determined first of all by determining a mean distance from the distances and subsequently determining a fluctuation margin of the distances to the mean distances, so that the quality level is determined from the determined fluctuation margin.

Subsequently, the preliminary object center is replaced by an improved object center (e.g. by means of shifting the preliminary object center). Then, a repeated determination of the distances of the contour candidate image points to the improved object center is executed. Newly determined distances may again be averaged and the fluctuation margin of the distance around the center may be determined. As far as the fluctuation margin has increased, the improved object center is discarded, however, as far as the fluctuation margin has decreased, the preliminary object center is replaced by the improved object center.

The improved object centers may, for example, be determined iteratively by ever finer grids, wherein a quality level is associated to each grid quadrant (or grid point), the level indicating the probability that the real object center is located within the grid quadrant (or in a surrounding of the grid point). For the example of an organic cell, the quality level may, for example, correspond to the section of the grid quadrant occupied by the cell nucleus. Alternatively, the quality value may also be evaluated according to whether the cell nucleus center is contained in the grid quadrant or how far away the cell nucleus center is.

Optionally, it may be advantageous, before the determination of the contour of the object or before the determination of the object center, to execute an image pre-processing, wherein the image pre-processing may include different forms of filters. The filters may, for example, filter out certain color components or make structures visible based on their specific color. In addition to that, digital images may, for example, be transformed into different color schemes or color spaces (e.g. RGB color space, HSV color space). The RGB color space specifies the color of an image point by the proportions of the three color components: red, green, blue. In an HSV color space, the color of an image point is indicated by an H value (hue or color type), an S value (saturation) and a V value (value or brightness).

The segmentation described in more detail in the following mainly relates to leukocytes—the inventive method may, however, also be applied to other objects, wherein objects may, for example, be inclusions in materials (e.g. cavities which ought to be determined and classified in material testing). In further embodiments it is also possible to segment and/or to classify morbid biological tissue like, for example, tumorous tissue. The classification here relates, for example, to the determination of the size and/or shape of the object, so that the object may be associated with size classes or shape classes (round, angular, oval, etc.). Embodiments may thus be used for any form of object detection and object classification which is to be executed automatically.

The segmentation of leukocytes (as an example of objects) described in more detail in the following represents an important component of a CAM system for generating differential blood counts. As an input, an (image) recording of a section of the object carrier may be used, wherein the section contains at least one leukocyte. Conventionally, such a recording is generated, for example, with a 630- to 1,000-fold magnification to guarantee a sufficient imaging of white blood cells. Alternatively, magnifications may be used in a range between 200× and 1,500×. The input field is, for example, in the shape of an RGB color image with a color depth of, for example, eight bits per channel. The object here is an exact separation of leukocytes and other objects contained in the image. Further, a separation between the nucleus and the plasma within the leukocytes is sensible.

Embodiments enable a boundary-accurate segmentation of the nucleus and the plasma, e.g. with leukocytes, wherein compared to conventional methods, any different types of leukocytes may be segmented. Apart from that, the exemplary leukocytes may also be completely segmented with neighboring erythrocytes. With respect to fluctuations in illumination and coloring, embodiments are extremely robust. In particular for white blood cells, embodiments provide a segmentation with a high resolution.

BRIEF DESCRIPTION OF THE DRAWINGS

In the following, embodiments of the present invention are explained in more detail with reference to the accompanying drawings, in which:

FIGS. 6a to 6h is an illustration of intermediate results of the individual method steps;

DETAILED DESCRIPTION OF THE INVENTION

Figure 1:
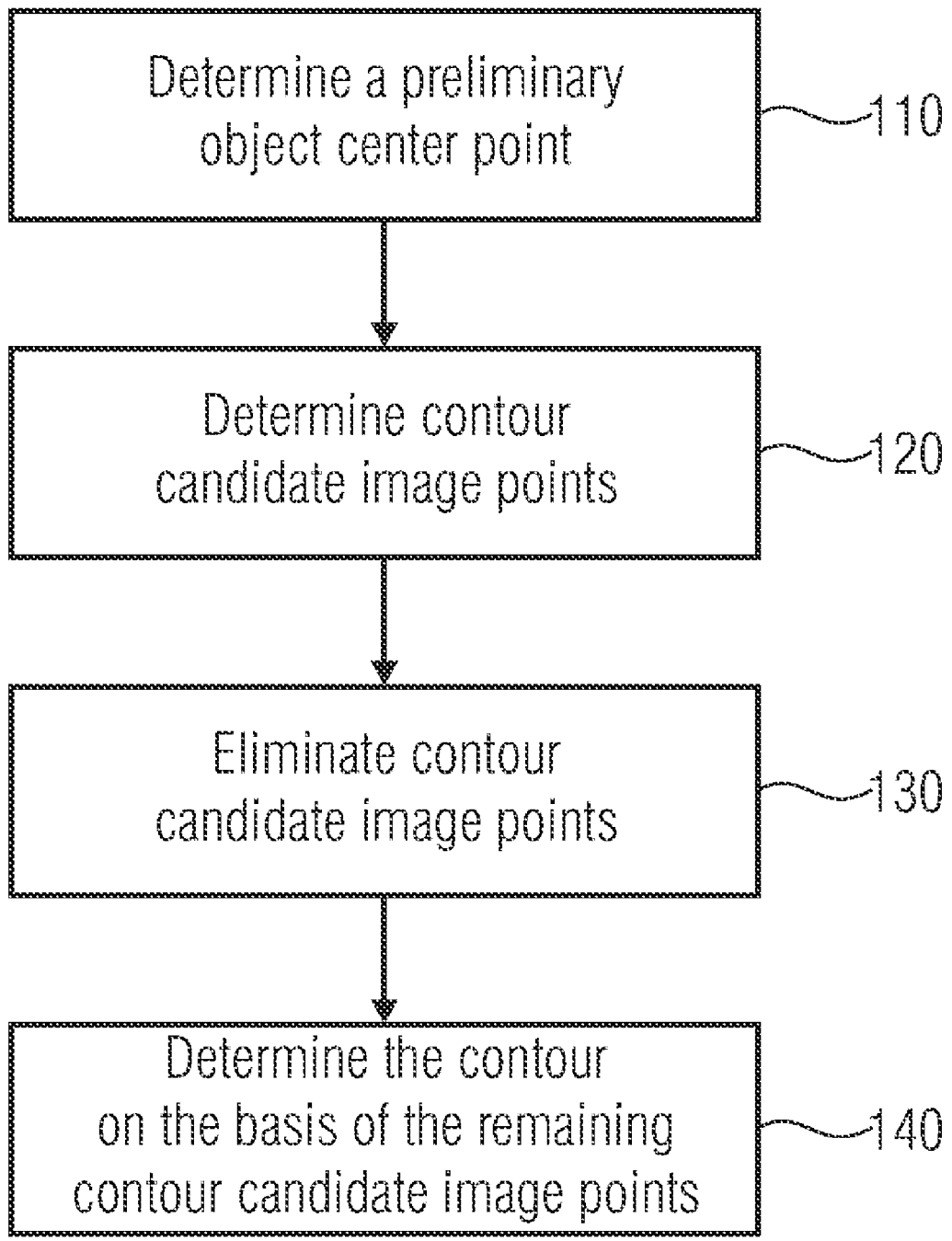
FIG. 1 is a flowchart for a method according to one embodiment of the present invention.

Before, in the following, the present invention is explained in more detail with reference to the drawings, it is to be noted that like elements in the figures are provided with the same or similar reference numerals and that a repeated description of these elements is omitted.

FIG. 1 shows a flowchart for an embodiment of the present invention. First, a determination of a preliminary object center 110 is executed, wherein the preliminary object center may initially be estimated by means of a digital image. Subsequently, the determination of contour candidate image points 120 is executed, which are, for example, determined by a color transition or a change of color gradients along paths leading away from the preliminary object center. As far as the digital image is generally represented by an image point value range in a feature space, the contour candidate image points may be determined by detecting a change from a first section or portion to a second section in the feature space or by detecting an exceeding of a predetermined strength of a feature change in the feature space. In the simplest case, the feature space is the color space (e.g. RGB or HSV), but may also be, e.g., a transformation of the color space.

In a next step, contour candidate image points are eliminated 130, wherein the elimination of contour candidate image points relates to those contour candidate image points determined between regions of extreme curvature in the second step 120.

The extreme curvature may, for example, be determined by a leap (outside a tolerance range) of the distance of a contour candidate image point to the preliminary object center. After the step of eliminating 130 remaining contour candidate image points may be used to determine the contour of the object which may, for example, be executed by an interpolation or by a path tracking between the remaining contour candidate image points. An interpolation may, for example, be used for bridging smaller sections, while path tracking is advantageous for closing larger parts, for example resulting from the elimination of contour candidate image points, in the contour. For path tracking, for example the conventional method of Dijkstra may be used.

Figure 2:
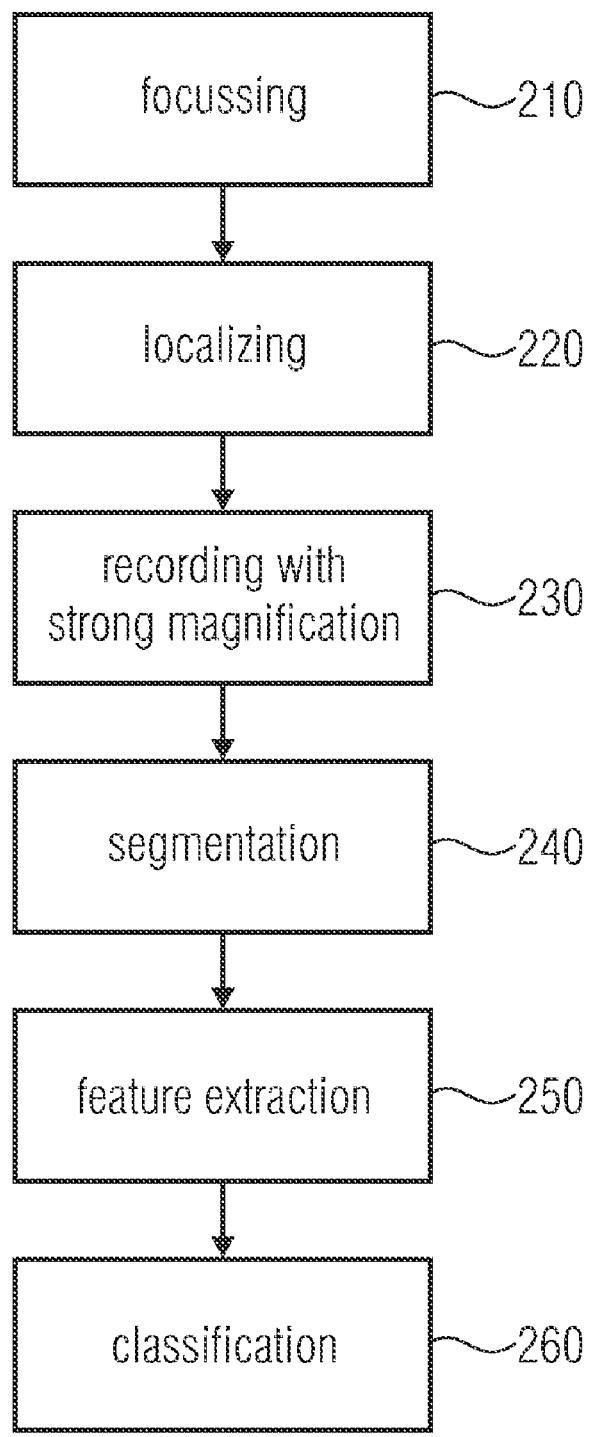
FIG. 2 is a flowchart for a CAM system.

FIG. 2 shows a flowchart for a conventional CAM system which may, for example, be used for the classification of blood cells. In a first step 210, here a localization of a white blood cell, for example with a low resolution, takes place (e.g. with a lens with a resolution of five, ten or twenty times). In the second step of localization 220, likewise a blood cell which is arranged as centrally as possible in the image is identified, which will then be examined more accurately in the subsequent steps. In a third step 230, now a magnification or enlargement of the image takes place, so that the blood cell localized in the or close to the image center in the second step 220 is accordingly magnified. The magnification may, for example, be executed with a lens with a magnification of more than 50 times or with a lens with a magnification of more than 100 times or a magnification of 200 times. In the fourth step 240 subsequently the segmentation of the object takes place (e.g. white blood cell), wherein this step is described in more detail later by embodiments of the present invention. In a fifth step 250, now using the segmentation results, a feature extraction takes place. The feature extraction may, for example, include determining the size of the cell, the shape of the cell (e.g. round, oval, elongated, diffuse). Using the results of the feature extraction in the fifth step 250, finally in the sixth step 260 a classification of the objects (like, for example, the while blood cell) may be executed.

Figure 3:
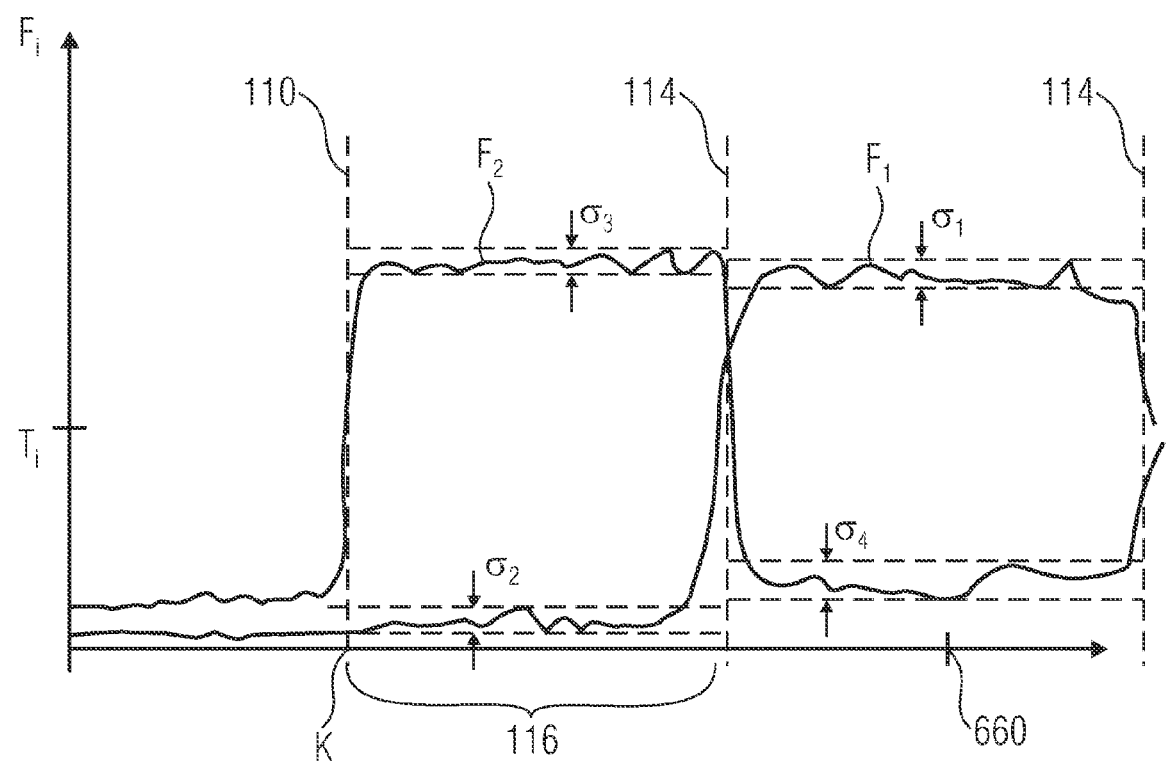
FIG. 3 shows an illustration for a change of color values in the nucleus, cell plasma and background.

FIG. 3 shows a graphical illustration of how, in a transition from the nucleus to the cell plasma or from the cell plasma to the background, certain components of the color space may change erratically. The change of a color component may, for example, include a color combination in the RGB color space, however equally includes changes in brightness or saturation when, for example, instead of the RGB color space, the HSV color space is used. Apart from the changes of color components, also a change of a color gradient (in the used color space) may be used for determining the transition. As an example, in FIG. 3 the change of the color components along one direction is illustrated, which, for example, leads from the object center 660 to the contour candidate image point K. The dashed line 114 represents the boundary curve of the nucleus 114, and the dashed line 110 represents the boundary curve of the cell contour (i.e. boundary curve of the cell plasma 116). As the nucleus comprises a specific color or color combination, at the boundary line 114 a spontaneous change of the corresponding color component $F_i$ results, designated by F1 in this illustration. The color component F1 comprises, however, both inside the nucleus 114 (on the right of the line 114) and also outside the nucleus 114 (on the left of the dashed line 114) certain fluctuations σ1, σ2, whose average values, however, clearly differ by for example more than 30%. The color component F1 may, for example, also be a combination of two colors, e.g. the ratio of green to blue (g/b) in the RGB color space.

The cell plasma comprises a different coloring with respect to the nucleus so that, in the area of the cell plasma 116, i.e. between the dashed line 114 and the dashed line 110, a different color component (or a different color combination), here designated by F2, comprises a clearly excessive value. Also for the further color component F2, inside the cell plasma 116 and also outside the cell plasma 116 fluctuations σ3, σ4 may result, wherein, however, average values for F2 inside and outside the cell plasma 116 clearly differ, e.g. by more than 30%.

The coloring of the nucleus and also of the cell plasma 116 and the cell background (left of the line 110) is executed here by a correspondingly selected pre-processing of the blood smear and may depend on the method selected.

A simple method for determining the transitions between the nucleus and the cell plasma or between the cell plasma and the background is exceeding or falling below a threshold value $T_i$ (e.g. when F1>T1 or F2>T2), wherein T1, T2, ... represent specific threshold values for the color components F1, F2, ....

To identify the contour candidate image points K, a change from a first section to a second section of the color space was used, and this change corresponds to a clear decrease of the component F2 at the dashed line 110. I.e., the correspondingly selected method ought to be sensitive for a sudden decrease of the component F2, but not to a sudden increase of the component F2, as it occurs, for example, at the nucleus borderline 114. Alternatively, the background may also be detected by a specific color component (e.g. the color combination (r+g+b)/3), so that the contour candidate image point K is given when, for example, (r+g+b)/3=T3 applies (with a tolerance of, for example, ±10%). The threshold value T3 may, for example, be adaptively determined for a respective image (e.g. depending on an average brightness) and is generally not a fixed threshold value.

The determination of the contour candidate image points K by means of a change from a first section to a second section of the color space is one possibility. Alternatively, also a change or a leap of a color gradient (in a used color space) may be used for determining the contour candidate image points K.

Figure 4:
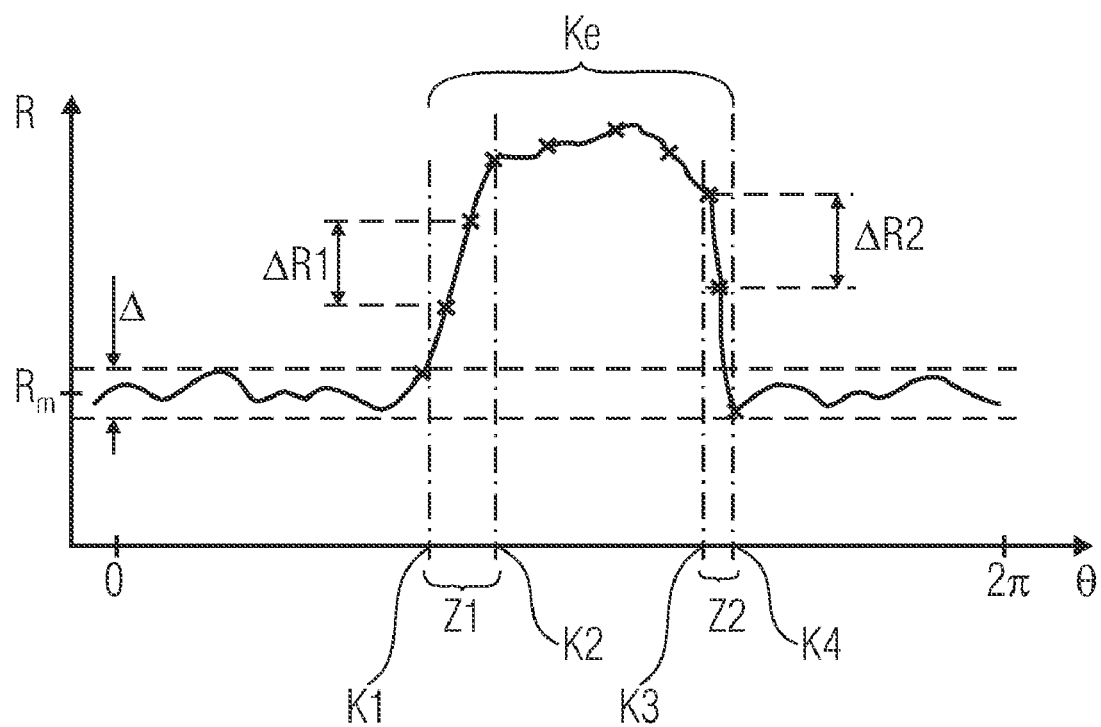
FIG. 4 is an illustration of zones including changes of radial distances above a threshold value.

FIG. 4 shows an illustration of the radial distances R of the contour candidate image points K as a function of a polar angle θ, wherein R and θ represent polar coordinates for the digital image. The contour candidate image points are here ordered according to their angle θ, and part of the contour candidate image points is represented by crosses. As far as the center is suitably selected (see description regarding FIG. 5), the distances R of the contour candidate image points K fluctuate only little or hardly at all. This may be illustrated by the contour candidate image points K fluctuating around a distance average value $R_m$ only in a range Δ. The fluctuation margin Δ of the distances of the contour candidate image points K is the smaller, the closer the shape of the white blood cells gets to a circle and the better the center of the exemplary circle was found. If, however, at the cell wall of the white blood cell for example a red blood cell was adsorbed, and likewise cell walls of the red blood cell were identified as contour candidate image points, then there are zones Z (Z1, Z2, Z3, . . . ) in which the radial distance R suddenly increases greatly and in an extreme case a leap exists. The leap or the suddenly increasing radial distance R of the contour candidate image points K is caused, for example, by the corresponding contour candidate image points not forming a contour border of the exemplary white cells, but instead representing contour points, for example of an adjacent red blood cell. The one cell wall of the adjacent red blood cell is at a clearly greater distance to the preliminary nucleus center.

As an example, FIG. 4 shows a first zone Z1 starting with the position of the contour candidate image point K1 and ending with the position of a second contour candidate image point K2. The zone Z1 is characterized by the fact that, within the zone Z1, the increase in the distance R has a value ΔR1 which is greater than the fluctuation margin Δ, which may still be tolerated. Between the second contour candidate image point K2 and a third contour candidate image point K3, the distances R of the intermediate contour candidate image points K again show only a slight fluctuation margin, while between the third contour candidate image point K3 and a fourth contour candidate image point K4 again a zone Z2 is implemented which is designated by a rapid decrease of the distances R. Contour candidate image points within the second zone Z2 comprise a difference ΔR2 regarding their distance R, which is greater than the tolerance margin Δ. From the fourth contour candidate image point K4 the distances of the individual contour candidate image points again only fluctuate within the tolerance margin Δ. As the polar angle θ only takes on values between 0 and 2π (or alternatively between −π and +π), the represented function at the point 2π is identical to the function at θ=0 (2π periodic).

The zones Z may thus also be determined by means of a threshold value method, e.g. the first zone Z1 is given by ΔR1>Δ and the second zone Z2 is given by ΔR2>Δ. Generally, the zones may be represented by the relationship ΔR>T, wherein ΔR is the radial increase of neighboring contour candidate image points and T represents a threshold value which may, for example, correspond to Δ. The threshold value T may, for example, be a certain percentage (e.g. 5% or 10% or 50%) of the distance R to which the increase ΔR relates.

The contour candidate image points Ke lying between the zones Z1 and Z2 are thus not contour points of the leukocytes and thus ought to be eliminated. Alternatively, the contour candidate image points Ke to be eliminated may also be determined via the curvature which an interpolation curve of all contour candidate image points K would have. The zones Z may also be determined by this curvature exceeding a threshold value. In order for such a method to operate reliably, however, an interpolation method is needed which executes an averaging, so that locally only a slightly varying curve results (e.g. ΔR/R<0.01).

Figure 5:
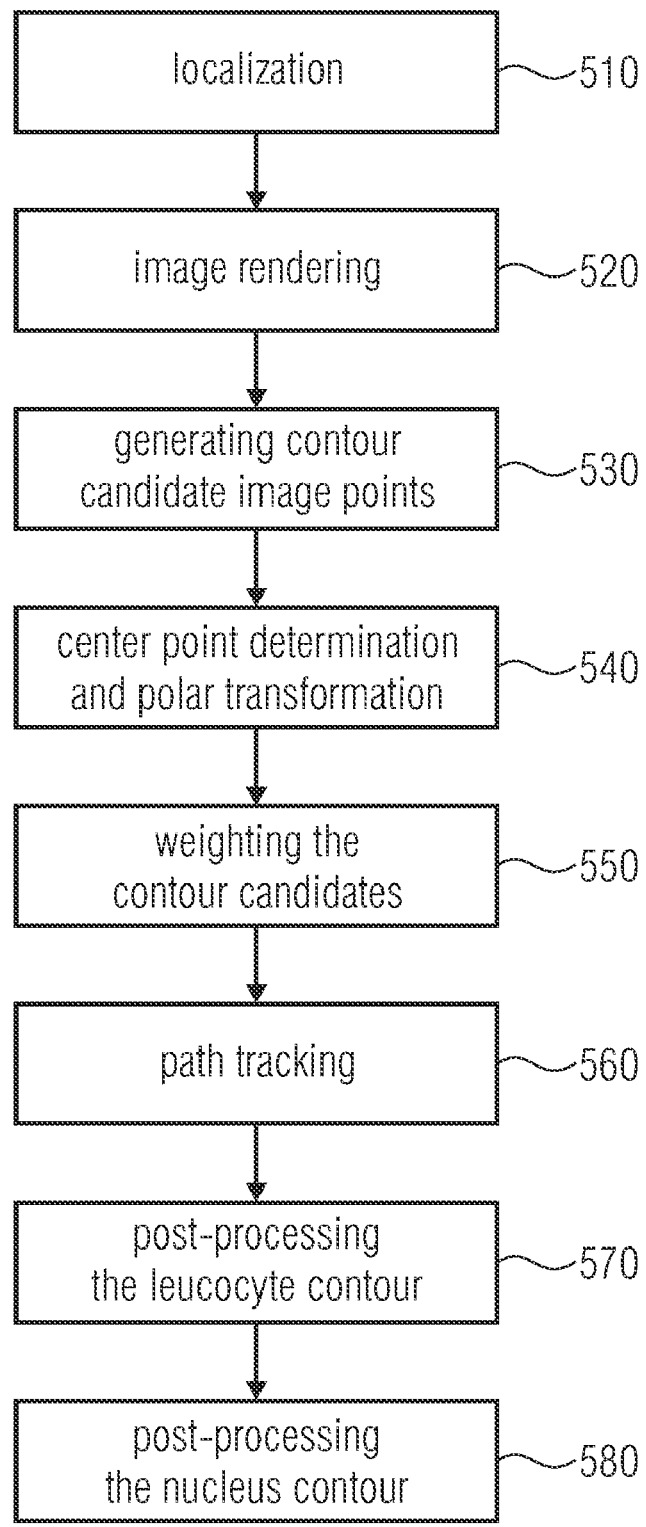
FIG. 5 is a detailed flowchart for segmentation.

FIG. 5 shows a detailed flowchart for a method according to a further embodiment of the present invention which comprises a series of optional steps (compared to FIG. 1) which may improve the result.

In a first step 510, again first of all a localization is executed. As in the input image often several leukocytes may exist and for the further processing steps one single cell is to be selected, it is often advantageous to first execute the localization. In the localization in the first step 510, first of all, for example, leukocytes contained in the image are localized. This may, for example, be done by means of a threshold value method in which color information of the individual pixels may be used. Here, for example, the ratio between green and blue channels of an input image may serve as a criterion, wherein three-channeled color images in the three basic colors red, green and blue are used. A pixel fulfilling the characteristic g/b>T2, wherein T2 represents a threshold value, is then classified as a leukocyte pixel. Here, g and b correspond to the green and blue values of the pixel and T2 is a fixed threshold value which may be determined empirically. For example, the threshold value T2 may have a value of 1.0, 1.2 or 1.4. From the thus resulting binary mask with different leukocyte regions, now one is selected (localized). This selection may take place, for example, using the following criteria:

(i) A predetermined minimum size should not be fallen short of. The minimum size here is a system parameter and may be determined absolutely in pixels. Its value is calculated from an expected physical minimum size of the cells and the magnification or resolution of the microscope system.

(ii) From all regions fulfilling the criterion (i) the one is selected which has the smallest distance to the center of the input image and which is thus mapped as closely as possible to the center of the input image. This may be substantiated by the fact that after localization of the individual cells with a low resolution each cell is approached in a high resolution such that it is located in the center of the field of view.

In a second step 520 image rendering is executed. It is the aim of rendering the image to improve the image quality for subsequent processing. Part of this is, for example, suppressing interfering structures, like, for example, image noise, contamination, etc. In this respect, different standard methods of image rendering may be used. Possible standard methods here are a filtering of the input image with an edge containing smoothing filter, like, e.g., a median filter or a Kuwahara filter (see FIG. 9). Alternatively, also anisotropic diffusion filters may be used.

In a third step 530, a generation of contour candidate image points is executed. In this respect, for example first of all an amount of candidate points for the leukocyte contour is generated. Frequently, the correct boundary of the leukocyte is either located at a transition from foreground to background pixels $C_{f,b}$ (=dashed line 110 in FIG. 3) or at a transition from the leukocyte to a possibly adjacent erythrocyte $C_{l,e}$. Possible contour points (=contour candidate image points) may, for example, be generated by suitable beams (=paths) from an estimated center within the leukocyte being tracked or followed outwards, so that contour candidates are generated along the beams passing outwards if a corresponding transition takes place (e.g. in a color space). The number of beams passing outwards may here be selected to be so high that a sufficiently dense amount of contour candidate image points is generated. For example, the number of the beams may be more than 100, approximately 150 or approximately 180 or between 150 and 300. To be able to determine the said transition, the background, leukocyte and erythrocyte pixels are accordingly marked. This may be executed, for example, as follows:

(A) Segmentation of the background: A segmentation of the background may, for example, be done by means of brightness, wherein all the pixels whose brightness exceeds a threshold value may be marked as background. In the RGB image the brightness may, for example, be parametrized by the color combination (r+g+b)/3, wherein r, g, b are each the red, green and blue color values in the RGB image. The threshold value may, for example, be a value between 150 and 400 or between 220 and 270 or approximately 245 (e.g. on an intensity scale from 0 to 500). To remove possibly occurring interfering particles in the image, for example, it may further be sensible to post-process the background mask by using morphological filters (so-called opening or closing).

(B) Separation of leukocytes and erythrocytes: To identify transitions from leukocytes to erythrocytes, for example first of all a pixel-wise segmentation of the foreground segmented after step (A) is executed. This segmentation may, for example, be executed based on different color of texture features. In the simplest case, a threshold value method is used to achieve a separation of leukocytes and erythrocytes using a hue of the pixels (hue channel of the HSI/HSV transformed image). The threshold value may be determined using known threshold value methods (e.g. the method of Otsu).

In a fourth step 540, a center determination and a polar transformation are executed. Under the assumption that leukocytes generally have a convex border and are often approximately circular, in this step the center of the cell is first of all estimated and, based on this center, a polar transformation of the contour candidate pixels (contour candidate image points K) extracted in the preceding step is calculated. In the simplest case, the intersection or center of gravity of the region of the selected leukocyte is used as a cell center $P_z$. All contour candidate image points K are now polar-transformed with respect to this center $P_z(x_0, y_0)$ using the function f(x, y):

$$f: R^2 \to ([-\pi, \pi], R^+), \quad (1)$$

$$\begin{bmatrix} \theta \\ R \end{bmatrix} = f(x, y) = \begin{bmatrix} \arctan((y - y_0)/(x - x_0)) \\ \sqrt{(x - x_0)^2 + (y - y_0)^2} \end{bmatrix}, \quad (2)$$

wherein x and y are two orthogonal coordinates parametrizing the image.

Under the precondition that the cell ought to be approximately circular and the center was determined correctly, thus as a (possible) cell contour an approximately constant function would result, i.e. independent of the angle θ and constant in the distance R (the radius). The further the used center deviates from the actual cell center, however, the greater the polar transformed function deviates from a constant function. Thus, a robust center estimation is advantageous. A more robust estimation of the cell center may be executed using the contour candidate image points K estimated in the previous step (third step 530, generation of contour candidate image points).

The determination of the cell center may, apart from that, be achieved by an optimizing method, wherein the optimum cell center is searched inside the cell. The individual steps of such a method may be summarized as follows:

(1) Establishing a regular grid with an exemplary grid distance t, wherein the grid may, for example, comprise a size of 3×3 grid points and is positioned such that the center of the grid corresponds to the actual center.

(2) Calculating a quality level for each grid point or each grid quadrant. The quality level here evaluates the probability with which the current grid point corresponds to the cell center and is, for example, calculated by the fact that using a robust estimation method (e.g. RANSAC) a model is adapted to the contour candidate points and then, for example, the mean square error (MSE) of the contour points is determined by the corresponding model. As a model here in the simplest case, a constant function for the r coordinate may be used.

(3) As long as the grid distance t is greater than the size of a pixel, the method may be continued with step (1), wherein, however, the grid distance is reduced accordingly (e.g. t→t/2 or t→t/3 is set).

In a fifth step 550 a weighting of the contour candidates is, for example, executed in the following way. As, after the determination of possible contour candidates, some points within the amount $C_{f,b}$ do not represent contour points at the border of the leukocytes and are interfering for the further processing, it is needed to initially eliminate these interfering points. In this respect, for example points within the quantity $C_{f,b}$ are determined, at which a strong curvature occurs at the contour. The strong curvature may, for example, be caused by a leap or a sudden increase in the distance R towards the center. Between the points of strong curvature, now all potentially erroneous contour points Ke are discarded (see also FIG. 4) if the contour segment greatly deviates from a constant function. This deviation may again be determined using a threshold value method. The search for such points corresponds, for example, to localizing erythrocytes which are attached to leukocytes.

In a sixth step 560, a path tracking is executed, wherein the points determined in the previous step (=remaining contour candidate image points) are connected using a path-finding method into a closed curve (contour).

In a seventh step 570, a post-processing of the leukocyte contour is executed as the contour determined in the sixth step 560 may still contain some outlier points which ought to be removed. This may, for example, be done by processing the complete contour using a median filter.

In an eighth step 580, finally a segmentation of the cell nucleus is executed. To determine the cell nucleus in this step, a threshold value method is applied to the complete region with the plasma contour (=within the convexly arranged contour candidate image points K). This threshold value method may again use the ratio between the green and blue channels as a basis (like in the first step 510). As in the application of the threshold value method still some interfering regions may exist within the plasma, it is sensible to remove these interfering regions in a further post-processing step. For this purpose, for example, again a morphological open/close filter may be used.

FIGS. 6*a* to 6*h* show intermediate results for the individual method steps.

FIG. 6*a* shows the input image with a leukocyte 610 comprising a cell nucleus 615 and being bounded by a contour 600. The cell plasma is located between the contour 600 and the cell nucleus 615. Several erythrocytes 620 are arranged at the leukocytes 610, wherein the exact separating line between the leukocytes 610 and the erythrocytes 620 is not clearly obvious in the input image. The leukocyte 610 is represented in front of a background 650 (e.g. a serum, blood or another liquid). The input image generally comprises several leukocytes, wherein FIG. 6 is already focussed on one of the several leukocytes 610. The illustration which is shown here is likewise applicable to general organic cells 610 and further organic cells 620. Only as an example, in the following the example of leukocytes as organic cells 610 and erythrocytes as further organic cells 620 is to be further described.

FIG. 6b first of all shows a preparation which may, for example, include a Kuwahara filtering, wherein the exemplary Kuwahara filtering is a non-linearly smoothing filter maintaining the edges. This optional filter pre-processing is frequently sensible for illustrating the contours of objects in the image more clearly, so that the later segmentation of the leukocyte 610 provides better results.

FIG. 6c shows the result of the following step, wherein first of all a center 660 was estimated and, starting from this center 660, star-shaped paths 670a, b, c, . . . are formed. Along these paths 670 formed in the shape of a star, in this method step first of all the contour candidate points K are determined, represented in FIG. 6c as a contour 600. The contour candidate points K may here, for example, be determined by a change from a first hue value into a second hue value (e.g. by a sudden change of a certain color component, see FIG. 3). As a consequence, both the contour points 600 are determined and also additional contour candidate image points Ke which form a contour of the erythrocytes with respect to the background 650—but not contour points of the leukocytes with respect to the background 650. Apart from that, in this threshold value method contour points of a contour section 605 are determined (between the contour candidate image points K1 and K4) which represent a separating line between the leukocytes 610 and the erythrocytes 620. Finally, further contour candidate image points Kw are localized, located either within the erythrocyte 620 or within the leukocyte 610. Both the further contour candidate image points Kw and also the additional contour candidate image points Ke relate to contour candidate image points which are not required or obstructive for the segmentation of the leukocyte and are thus eliminated in a subsequent method step.

FIG. 6d shows how the center 660 may be optimized. As the center was estimated in a first step (for example via a center of gravity estimation of the leukocyte or the nucleus of the leukocyte), the center 660 frequently does not correspond to the real center of the leukocyte 610. In order to achieve an improvement, a grid G may be placed upon the leukocyte such that most or, if possible, all contour candidate image points K, Ke, Kw are covered by the grid G. The grid G may, for example, be a 3×3 grid, wherein the respective three grid points are arranged at a grid distance t and the estimated center is, for example, arranged in the center of the grid. Subsequently, the grid may now be refined such that the grid quadrant with the highest probability for the center 660 to be located within the grid quadrant is provided with a further, smaller grid. The smaller grid G1 may, for example, again included a 3×3 grid, wherein each grid point of the smaller grid G1 comprises a grid distance of t/3 and again a quality level is associated to each grid point which indicates the probability that the real center 660 is located within the grid quadrant. This process may be continued successively until the real center has been determined with a sufficient probability (e.g. with an error tolerance of ±20% or ±10% or ±5%). Alternatively, the iterations for center determination may be continued until the size of a grid segment or grid quadrant corresponds to a pixel (an image point).

To be able to estimate how good the respective center 660 is in the iterative method, the image may, for example, be rolled off or unwound so that R and θ form an orthogonal coordinate system. As far as the center 660 was found to be in very good correlation to the real center, the contour 600 would mainly approximate a flat line in the unwound image—apart from those sections comprising the additional contour candidate image points Ke. In general, it may frequently be assumed that a leukocyte 610 comprises a virtually round shape.

Figure 6E:
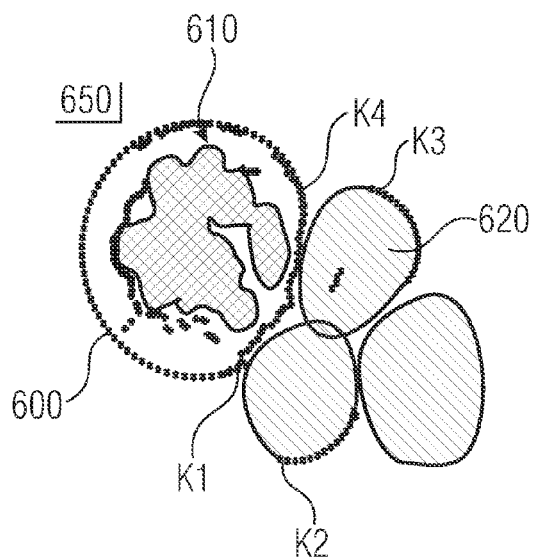
Figure 6F:
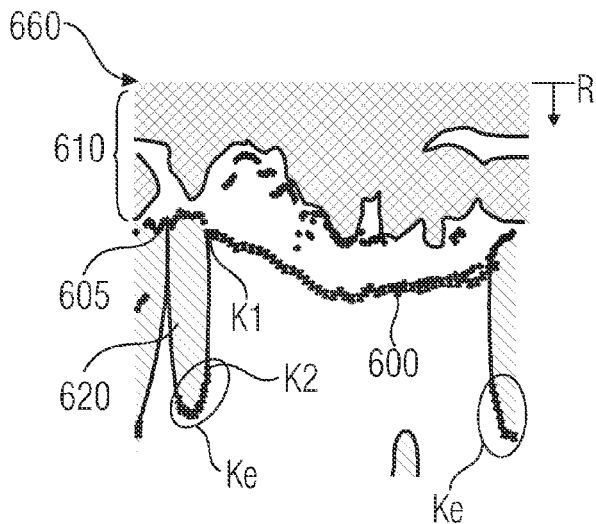

FIGS. 6e and 6f show the process of unwinding. FIG. 6e corresponding to FIG. 6c (the center 660 was not plotted here) shows contour candidates, wherein a difference is made between a transition to the background 650 and a transition from a leukocyte 610 to an erythrocyte 620 (between the contour points K1 and K4).

FIG. 6f shows the result of unwinding, wherein the point R=0 corresponds to the center 660 and R represent the radial distance from the center. The center 660 is thus illustrated in FIG. 6f as the top line, wherein the radial distance R increases downwards from the center 660. In the horizontal direction here the polar angle θ is illustrated. Accordingly, in FIG. 6f the erythrocytes 620 and the leukocytes 610 are illustrated in a deformed way, wherein the contour 600 is virtually constant at least in parts.

Generally, the functions will comprise a wavy structure when unwinding, which necessitates improvement of the center. For quality determination for the respective center 660, now an average value for the contour points 600 may be formed and the average square of the distance (fluctuation margin) of the determined average value may be determined. The greater the fluctuation margin, the worse the respectively determined average value will be. As long as the determined fluctuation margin is above a threshold value, the iterative process (towards ever smaller grids, see FIG. 6d) may be continued. In each iterative step, the fluctuation margin ought to decrease—as far as the fluctuation margin increases this may be simultaneously interpreted such that, thus, an already very well determined center 600 has been found.

FIG. 6f thus shows both the contour 600 and also the contour section 605 (left of K1). Further, the contour image points Ke are illustrated which are located at a greater distance from the contour 600, as the radial distance R of the contour image points Ke to be eliminated from the center 660 is clearly greater (see FIG. 6d).

To find out which contour image points belong to the contour image points Ke to be eliminated, any contour candidate image points K may be connected into a curve, wherein the points with an extremely strong curvature (e.g. between the contour image point K1 and the contour image point K2) represent an indication that the contour 600 at this point takes a leap and the contour image points to be eliminated Ke follow.

Figure 6G:
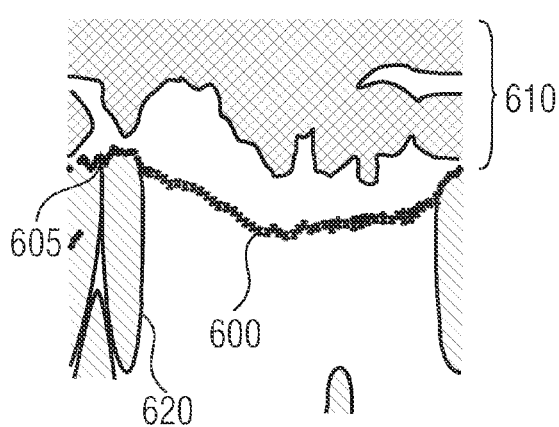

FIG. 6g shows the result after the elimination of the additional contour points Ke. After the elimination of the addition contour points Ke for example a path-tracking algorithm may be used to connect the contour 600 with the additional contour section 605 into a uniform contour 600.

Figure 6H:
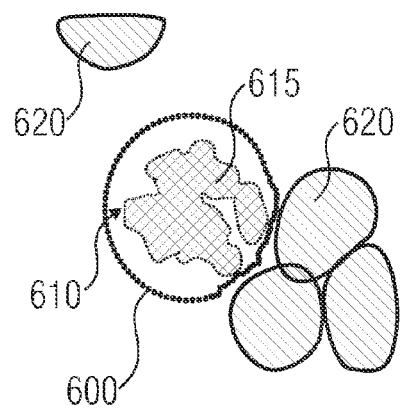

FIG. 6h shows the result of this segmentation, i.e. the leukocyte 610 comprises a uniform contour 600 partially passing between the leukocyte 610 and the erythrocyte 620. Further, the leukocyte comprises a nucleus 616.

Figure 7:
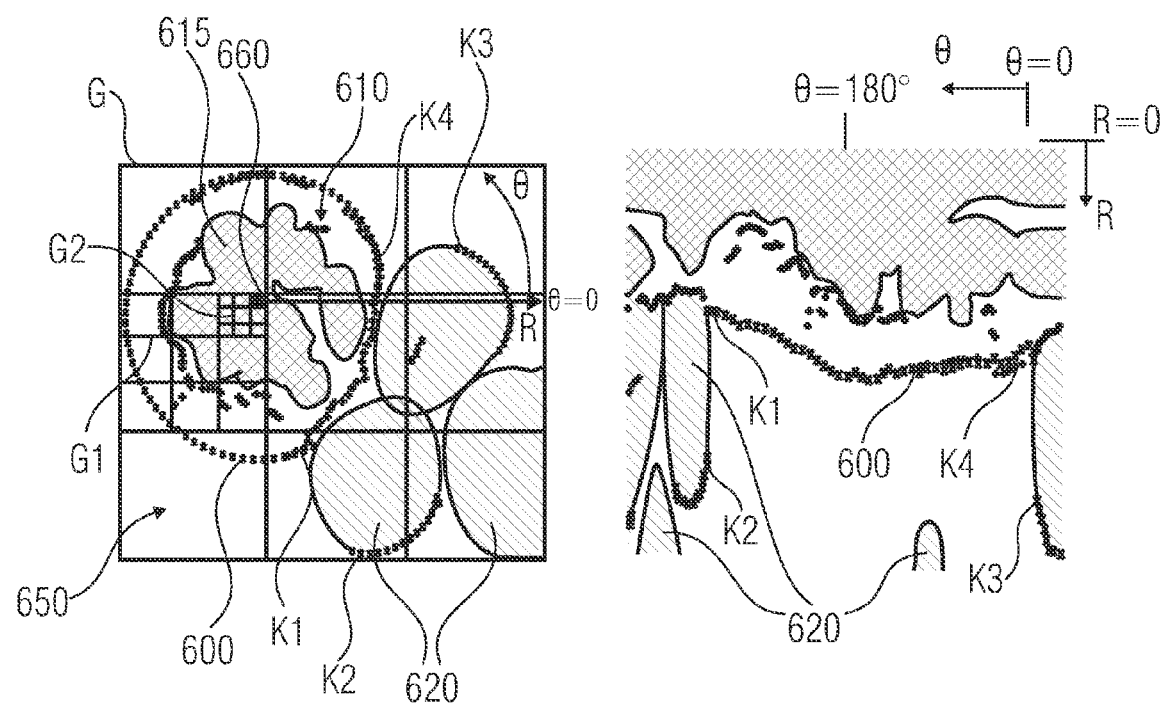
FIG. 7 is an illustration for representing an iterative search of the nucleus center.

FIG. 7 illustrates the iterative search for the cell center 660. First of all a grid is placed onto the region containing the contour candidate image points K. The grid may, for example, comprise 3×3 grid points (or generally N×M grid points, wherein N,M=2, 3, 4, . . . ), so that if possible all identified contour candidate image points K lie within the grid. To each grid segment (or grid quadrant) or grid point, a measure is then allocated which indicates the probability that the center 660 of the cell 610 is present within the grid point. Subsequently, the grid segment is selected comprising the highest probability that the cell center is localized within this grid segment. Subsequently, a new grid G1 (e.g. again a 3×3 grid) is placed in the identified grid segment and the procedure is repeated so that again a probability is allocated to each grid segment of the second grid G1 and the cell center 660 is arranged within the grid segment. After the grid segment with the highest probability has again been identified, a third grid G2 is placed over the determined grid segment and the sequence of steps is repeated successively. Thus, iteratively (by a finer granularization) the cell center is approximated to the real cell center.

The probability associated with each grid segment may, for example, be determined as follows. In this respect it is assumed that, for example, the center (or another point) of the grid segment represents the cell center 660. Subsequently, a coordinate transformation of the positions of the contour candidate image points K into polar coordinates with respect to the assumed center is executed, i.e. a distance coordinate $R_i$ to the assumed cell center 660 (=center of the respective grid segment i=1, ..., 9) and a corresponding polar angle variable are calculated. Thus, a function $R_i=R_i(\theta)$ results for the contour candidate image points (one function for each grid segment).

As, however, for the real cell center the contour candidate image points form a virtually constant function (R=constant), the functions for the individual grid segments will strongly differ and generally not be similar to a constant function. Each function $R_i$ for the contour candidate image points K which may be best approximated by a constant function (among all nine curves) here represents the grid point with the highest probability for the cell center 660. Here, for example, the square error may serve as a measure for the approximation to a constant function, wherein first of all an average value is formed and subsequently the square error is determined. In further embodiments, also other statistical variables may be taken as a measure for the probability that the cell center 660 lies in a grid segment. A further example would be the standard deviation or a weighted measure for the deviation.

On the right side in FIG. 7 the contour 600 of the contour candidate image points K is illustrated, wherein the center estimation already provided a very good result (the contour 600 is virtually constant across wide areas). The center estimation shown on the right in FIG. 7 thus results from an unwinding of the contour (illustrated on the left in FIG. 7) around a center 660 which already provides a good estimation.

Figure 8:
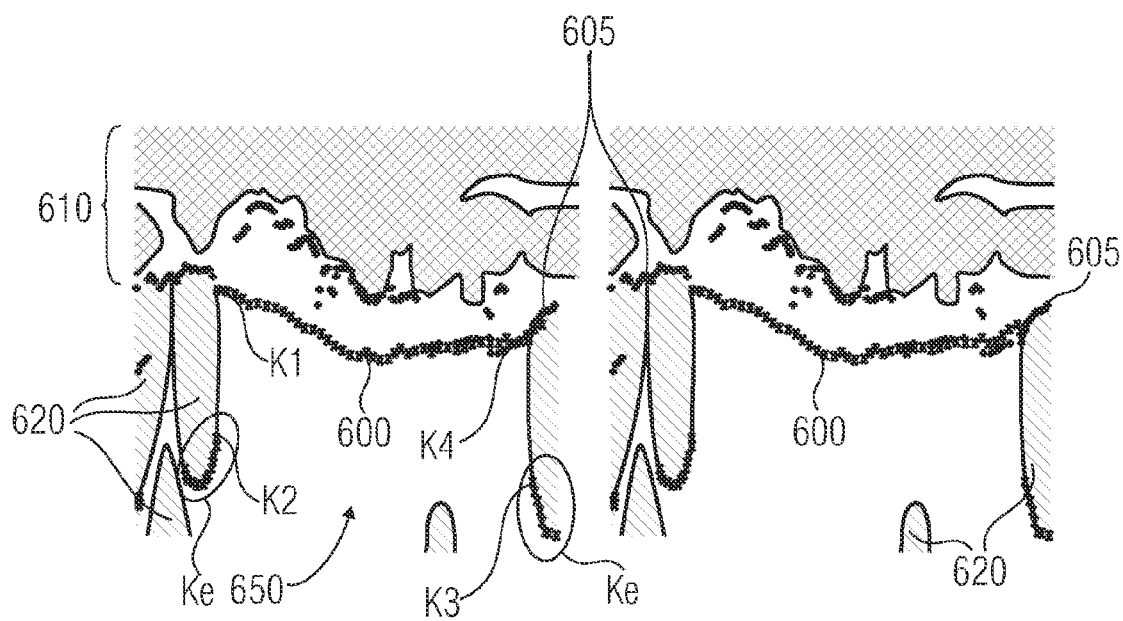
FIG. 8 is an illustration for the elimination of contour candidate image points between points of extreme curvature.

FIG. 8 shows an illustration for the quantity Ke of the points $C_{f,b}$ which are to be eliminated between two points of extreme curvature. On the left FIG. 8 again shows the unwound contour which still contains the additional contour candidate image points Ke to be eliminated and on the right FIG. 8 shows the corresponding illustration, in which the additional contour candidate image points Ke to be eliminated have been removed. The contour 600 of the contour candidate image points K signalizing the transition between the cell plasma and the background 650 here jump from the first contour candidate image point K1 to the second contour candidate image point K2, wherein the second contour candidate image point K2 was identified erroneously as a contour point between the cell plasma and the background 650 and actually represents a contour point between the erythrocyte 620 and the background 650. When connecting the contour 600 to the additional contour candidate image points Ke to be eliminated, thus at the position of the first contour candidate image point K1 a very strong curvature would form, which is a clear indication that the additional contour candidate image points Ke do not belong to the cell contour of the leukocyte 610. Thus, the additional contour candidate image points Ke lying between such leaps or such strong curvatures are eliminated. The result is illustrated on the right in FIG. 8 where the contour candidate image points Ke representing a contour edge of the erythrocytes have been eliminated. The contour 600 may then be connected with the contour section 605, wherein the contour 605 marks the boundary line between the leukocytes and the erythrocytes.

Figure 9:
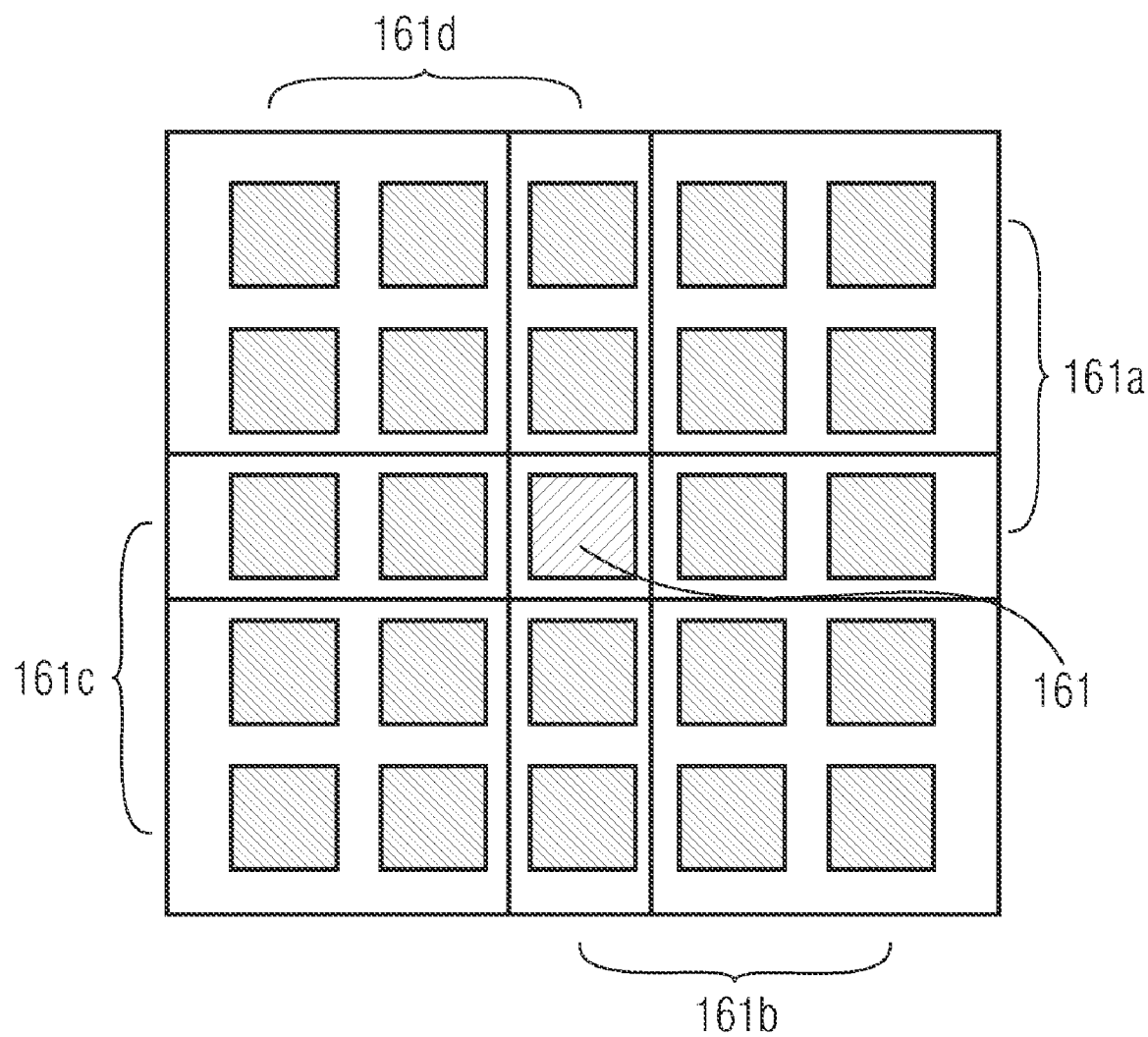
FIG. 9 is an illustration of a possible pre-processing by means of a Kuwahara filter.

FIG. 9 shows an image processing by means of a Kuwahara filter representing a non-linear smoothing filter and maintaining the edges and which is sensible for image pre-processing (see KUWAHARA, M., HACHIMURA, S: EIHO and M. KINOSHITA: *Digital Processing of Biomedical Images*. Plenum Press, New York, USA: 1976). As illustrated in FIG. 9, here around a given image point 161 an area with an odd number of image points (5×5 in FIG. 2b) is formed so that the given image point 161 lies in the center of the area. Finally, four regions 161a, 161b, 161c, 161d are formed, so that the central image point 161 each represents a corner point of the four regions 161a, ..., 161d. For each region an average brightness with a corresponding standard deviation is formed. The Kuwahara filter now allocated the central image point 161 to the average value of the region comprising the smallest standard deviation.

In embodiments, also the above-mentioned conventional threshold value methods may be used to detect a change in a certain hue value (e.g. to detect the contour candidate image points K along the paths) Likewise, the mentioned conventional path-finding algorithms may be used in embodiments—for example to connect the plurality of contour candidate image points K into a continuous contour 600.

In further embodiments, the areas of strong curvature or leaps in the distance R are determined in a frequency illustration. As far as the contour 600 is ideally virtually circular, only low frequencies will occur. Leaps (strong curvatures), however, appear in frequently occurring high frequencies in the frequency illustration and may, for example, be determined by means of a threshold value method.

It is in particular to be noted that, depending on the circumstances, the inventive scheme may also be implemented in software. The implementation may be on a digital storage medium, in particular a floppy disc or a CD having electronically readable control signals which may cooperate with a programmable computer system so that the corresponding method is performed. In general, the invention thus also consists in a computer program product having a program code stored on a machine-readable carrier for executing the inventive method when the computer program product is executed on a computer. In other words, the invention may thus be realized as a computer program having a program code for executing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for determining a contour of an object in a digital image, comprising:
   determining a preliminary object center;
   determining contour candidate image points as image points on a plurality of paths leading away from the preliminary object center, by detecting a change from a first section to a second section of a feature space based on an image point value range of the digital image or by detecting the exceeding of a predetermined strength of a feature change in the feature space, wherein the detection is executed along the paths leading away and the contour candidate image points comprise distances to the preliminary object center and are ordered according to a polar angle;

evaluating the distances to acquire a quality level for the preliminary object center;

determining a further object center and further distances of the contour candidate image points to the further object center;

evaluating the further distances to acquire a further quality level, wherein the quality level and the further quality level indicate probabilities that the respective preliminary or further object center is located at the center in the contour;

selecting an improved object center point from the preliminary or the further object center using the quality level and the further quality level;

determining zones of neighboring contour candidate image points within which a change of the distances or the further distances of the contour candidate image points is above a threshold value;

eliminating contour candidate image points lying between the zones of neighboring contour candidate image points and comprising greater distances than the remaining contour candidate image points; and determining the contour on the basis of the remaining contour candidate image points, wherein the quality level and the further quality level indicate probabilities that the corresponding preliminary or further object center are at the center of the contour.

2. The method according to claim 1, wherein the threshold value corresponds to 5% or 10% or 50% of the distance.

3. The method according to claim 1, further including pre-processing the digital image, wherein the pre-processing comprises a filtering of the digital image, wherein a filter comprises an edge-maintaining smoothing filter or an anisotropic filter, or wherein the pre-processing comprises detecting the sizes of objects and eliminating objects lying below a minimum size.

4. The method according to claim 1, further comprising post-processing for the contour, wherein the post-processing comprises a median filter or a morphological filter.

5. The method according to claim 1, wherein determining the contour candidate image points comprises checking image points as to whether a sum of their three color components in an RGB color space passes a predetermined threshold.

6. The method according to claim 1, wherein the plurality of paths comprises between 50 and 400 or between 140 and 220 or approximately 180 paths.

7. The method according to claim 1, wherein determining the preliminary and the further object center comprise arranging a grid with a first and a second grid segment, wherein as a preliminary object center a predetermined point in the first grid segment is selected, and wherein as a further object center a predetermined point in the second grid segment is selected, and wherein selecting further comprises selecting a grid segment with a highest quality level.

8. The method according to claim 1, wherein the object is an organic cell with a cell nucleus and cell plasma, wherein the cell plasma is delimited from a background by a contour.

9. The method according to claim 8, which further comprises determining a cell nucleus and wherein determining the cell nucleus comprises checking image points as to whether a ratio of a green to a blue color component exceeds or falls short of a threshold value.

10. The method according to claim 1, further comprising differentiating between the organic cell and further organic cells, wherein the differentiation of leukocytes and erythrocytes is determined by a change of a hue value or a further color gradient change.

11. The method according to claim 10, wherein the change of the hue value is determined by a change in the H channel of an HSI- or HSV-transformed image.

12. The method according to claim 1, further comprising segmenting the cell nucleus, wherein image points of the cell nucleus are determined by a threshold value method, wherein the ratio between the green and the blue component of an RGB image exceeds or falls short of a threshold value.

13. The method according to claim 1, wherein determining the contour on the basis of the remaining contour candidate image points comprises a path-tracking method, wherein the path-tracking method generates a closed curve as a contour.

14. A method for determining a center of an organic cell with a cell nucleus and cell plasma to segment the same in a digital image, wherein the cell plasma is delimited by a contour of the object from a background and defined by a plurality of contour candidate image points, comprising:

(a) determining a preliminary object center;
(b) determining distances of the plurality of contour candidate image points to the preliminary object center;
(c) evaluating the distances to acquire a quality level for the preliminary object center;
(d) determining a further object center and repeating steps (b) and (c) for the further object center to acquire a further quality level; and
(e) selecting an object center from the preliminary or the further object center using the quality level and the further quality level.

15. The method according to claim 14, wherein the step (c) comprises:

(c1) determining an average distance from the distances;
(c2) determining a fluctuation margin of the distances to the average distance to determine the quality level from the determined fluctuation margin.

16. The method according to claim 14, wherein step (a) comprises arranging a grid with a first and a second grid segment, wherein as a preliminary object center a predetermined point in the first grid segment is selected and wherein as a further object center a predetermined point in the second grid segment is selected, and wherein the step (e) comprises selecting a grid segment with a highest quality level.

17. The method according to claim 16, wherein the steps (a) to (d) are continued iteratively by arranging a further grid with a plurality of further grid segments into the grid segment with the highest quality level, wherein a further quality level is associated to each further grid segment and a further grid segment with a highest further quality level is selected.

18. A device for determining a contour of an object in a digital image, wherein in the digital image the object comprises a first hue value and a background comprises a second hue value, comprising:

a determiner for determining a preliminary object center;

a determiner for determining contour candidate image points as image points on a plurality of paths leading away from preliminary object centers by detecting a change from a first section to a second section of a feature space based on an image point value range of a digital image or by detecting the exceeding of a predetermined strength of a feature change in the feature space or by detecting the exceeding of a predetermined strength of a feature change in the feature space, wherein detecting is executed along the paths leading away and the contour candidate image points comprise distances to the preliminary or to an improved object center and are ordered according to a polar angle;

an evaluator for evaluating the distances to acquire a quality level for the preliminary object center;

a selector for selecting an improved object center using the quality level;

a determiner for determining zones of neighboring contour candidate image points within which a change of the distances of the contour candidate image points lies above a threshold value;

an eliminator for eliminating contour candidate image points between the zones of contour candidate image points, wherein the contour candidate image points to be eliminated comprise greater distances than the remaining contour candidate image points; and a determiner for determining the contour on the basis of the remaining contour candidate image points, wherein the quality level indicates a probability that the preliminary object center lies in the center of the contour.

19. A device for determining a center of an object in a digital image, wherein a contour of the object is defined by a plurality of contour candidate image points, comprising:

a determiner for determining a preliminary and a further object center;

a determiner for determining distances of the plurality of contour candidate image points to the preliminary and to the further object center;

an evaluator for evaluating the distances to acquire a quality level for the preliminary object center and a further quality level for the further object center; and a selector for selecting an object center from the preliminary or the further object center using the quality level and the further quality level.

20. The device according to claim 19, wherein the evaluator for evaluating is implemented to determine the quality level and the further quality level from a fluctuation margin of the distances to an average distance.

21. A non-transitory computer readable medium including a computer program comprising a program code for executing, when the computer program is executed on a computer, a method for determining a contour of an object in a digital image, the method comprising:

determining a preliminary object center;

determining contour candidate image points as image points on a plurality of paths leading away from the preliminary object center, by detecting a change from a first section to a second section of a feature space based on an image point value range of the digital image or by detecting the exceeding of a predetermined strength of a feature change in the feature space, wherein the detection is executed along the paths leading away and the contour candidate image points comprise distances to the preliminary object center and are ordered according to a polar angle;

evaluating the distances to acquire a quality level for the preliminary object center;

determining a further object center and further distances of the contour candidate image points to the further object center;

evaluating the further distances to acquire a further quality level, wherein the quality level and the further quality level indicate probabilities that the respective preliminary or further object center is located at the center in the contour;

selecting an improved object image point from the preliminary or the further object center using the quality level and the further quality level;

determining zones of neighboring contour candidate image points within which a change of the distances or the further distances of the contour candidate image points is above a threshold value;

eliminating contour candidate image points lying between the zones of neighboring contour candidate image points and comprising greater distances than the remaining contour candidate image points; and determining the contour on the basis of the remaining contour candidate image points, wherein the quality level and the further quality level indicate probabilities that the corresponding preliminary or further object center are at the center of the contour.

22. A non-transitory computer readable medium including a computer program comprising a program code for executing, when the computer program is executed on a computer, a method for determining a center of an organic cell with a cell nucleus and cell plasma to segment the same in a digital image, wherein the cell plasma is delimited by a contour of the object from a background and defined by a plurality of contour candidate image points, the method comprising:

(a) determining a preliminary object center;

(b) determining distances of the plurality of contour candidate image points to the preliminary object center;

(c) evaluating the distances to acquire a quality level for the preliminary object center;

(d) determining a further object center and repeating steps (b) and (c) for the further object center to acquire a further quality level; and (e) selecting an object center from the preliminary or the further object center using the quality level and the further quality level.

* * * * *